United States Patent Office 3,257,343
Patented June 21, 1966

3,257,343
HYDROXY-ESTER MODIFIED POLYSILOXANE RESINS REACTED WITH ORGANOPOLYISOCYANATES
Milton A. Glaser, Glencoe, and George K. Hughes, Waukegan, Ill., assignors to Midland Industrial Finishes Company, Inc., Waukegan, Ill., a corporation of Delaware
No Drawing. Filed Feb. 11, 1965, Ser. No. 431,976
13 Claims. (Cl. 260—18)

This invention relates to new coating resins and compositions.

This application is a continuation-in-part of now abandoned application Serial No. 412,827, filed November 20, 1964, which, in turn, is a continuation-in-part of now abandoned application Serial No. 144,320, filed October 11, 1961.

These coating compositions may be easily applied as a liquid and either baked or air-dried on the surfaces of a wide variety of materials such as metal and cellulosic materials such as wood. The resulting baked-on or air-dried coating compositions adhere well to the underlying surface and do not require the prior application of a primer coating before being applied to metals, have good storage and toughness properties, and have outstanding chemical resistance characteristics.

Our coating compositions are particularly well-suited for coating aluminum, ferrous metals such as steel, magnesium, and the like, and may be used to coat flexible substrates and unsupported metal foil (e.g., thickness of about 0.001–0.005 inch) and supported (e.g., with paper) metal foil (e.g., thickness of about 0.00025–0.001 inch). Plastic films or sheets such as Mylar (poly(ethylene terephthalate)), Tedlar (polyvinyl fluoride) and polypropylene may also be coated with our coating compositions.

The liquid coating compositions embraced by our invention may be applied to metal surfaces by the usual roll-coating machines or may be applied by spraying, brushing or dipping operations. They may be baked-on at temperatures of about 250–400° F. for about 30 minutes to about 1½ hours, air-dried, or subjected to baking followed by air-drying.

More specifically, our new coating resin comprises the reaction product of (a) aliphatic, saturated or mono- or poly-ethylenically unsaturated monocarboxylic fatty acid ester of polyhydric alcohol wherein the polyhydric alcohol portion of said ester has at least 2 free hydroxyl groups (does not exclude the presence also of an aromatic or saturated or ethylenically unsaturated aliphatic acid ester modifying group in (a), as described below), (b) an organosiloxane having free hydroxy and/or alkoxy groups, and (c) an organic or organopolyisocyanate. In preparing this reaction product, the siloxane and polyisocyanate constituents become bonded by chemical linkage to said monocarboxylic acid ester of polyhydric alcohol by reacting with the hydrogen of the hydroxyl groups of the polyhydric alcohol portion of the ester.

The aliphatic, saturated or mono- or poly-ethylenically unsaturated monocarboxylic acid ester of polyhydric alcohol may be prepared by reacting an aliphatic, saturated or mono- or poly-ethylenically unsaturated mono-carboxylic acid or anhydrides (e.g., having at least 2, 3 and 4 carbon atoms for the saturated, mono-ethylenically unsaturated, the poly-ethylenically unsaturated acids, respectively) with a polyhydric alcohol having at least 3 free hydroxyl groups. This ester may be prepared, for example, by reacting oleic acid, a non-drying oil such as coconut oil (which contains saturated acids such as caprylic, capric, lauric, myristic, palmitic and stearic acids, and unsaturated acids such as oleic and linoleic acids), a drying oil (e.g., vegetable oil) such as linseed oil, or a semi-drying oil (e.g., vegetable oil) such as soybean oil (both linseed and soybean oils contain linoleic and linolenic acids which are unsaturated acids) with a polyhydric alcohol. Polyhydric alcohols such as triols, as exemplified by glycerin, trimethylol ethane and tri-methylol propane, and tetrols, as exemplified by pentaerythritol, may be used. In this reaction, the fatty acid tri-glyceride present in the oil undergoes transesterification, when reacted with a proper amount of polyhydric alcohol, to form what is commonly referred to as a "monoglyceride" that is an aliphatic monocarboxylic acid ester of polyhydric alcohol.

The aliphatic, saturated or ethylenically unsaturated monocarboxylic acid ester of polyhydric alcohol may then be reacted with an organosiloxane having free hydroxy and/or lower alkoxy (e.g., methoxy) groups.

Organosiloxanes may be used made up of units of the general formula $$R_n Si(OR')_m O_{\frac{4-n-m}{2}}$$

in which each R is the same or different monovalent hydrocarbon radical, each R' is the same or different substituent from the group consisting of a hydrogen atom and alkyl radicals of less than 6 carbon atoms, $n$ has an average value of from 0.90 to 1.90, and $m$ has an average value of from 0.1 to 1.5.

One may use, for example, organosiloxanes having aryl (e.g., phenyl) groups, as well as hydroxyl and/or lower alkoxy groups, such as a phenylmethylsiloxane having free methoxy groups, as exemplified by Sylkyd 50 which is dimethyltriphenyltrimethoxytrisiloxane having the formula

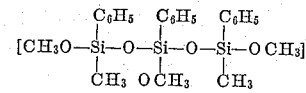

and an organosilsequioxane having free hydroxy groups (wherein the major proportion of substituted organo groups are phenyl groups), such as Dow Corning Z-6018 which has been described by the following representative formula, where R indicates an organic group (principally phenyl but having about 3–8% hydroxyl):

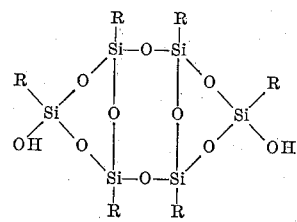

The average molecular weight of the above-identified Dow Corning's Z-6018 is about 1600.

The aliphatic, saturated or ethylenically unsaturated monocarboxylic acid ester of polyhydric alcohol-siloxane reaction product may then be reacted with an organic polyisocyanate, such as an aliphatic polyisocyanate, as exemplified by hexamethylene diisocyanate and methylene bis(4-cyclohexyl isocyanate) as represented by the formula

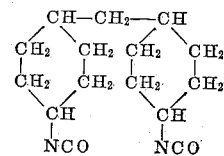

and arylene diisocyanates or aryl triisocyanates. We prefer to use arylene diisocyanates, as exemplified by toluene diisocyanate.

If desired, in addition to the use of the particular required aliphatic, saturated or mono- or polyethylenically unsaturated monocarboxylic acids mentioned and used above with respect to the preparation of the esters of group (a), above, one may also include in the preparation of our new coating resins, ester modifying groups formed with or from (1) polycarboxylic acids (or anhydrides) such as aliphatic, saturated polycarboxylic acids (having at least 2 carbon atoms), as exemplified by oxalic, malonic, adipic and sebacic acids, aliphatic, ethylenically unsaturated polycarboxylic acids (having at least 4 carbon atoms), as exemplified by maleic, fumaric, and 2-octenedioic acids, and aromatic polycarboxylic acids (having at least 8 carbon atoms), as exemplified by phthalic acid, as well as (2) monocarboxylic acids (or anhydrides) such as aliphatic, saturated monocarboxylic acids (having at least 2 carbon atoms), as exemplified by acetic, heptanoic, pelargonic, caprylic, myristic, capric, palmitic, stearic, and lauric acids, aliphatic, ethylenically unsaturated monocarboxylic acids (having at least 3 carbon atoms), as exemplified by acrylic, methacrylic, sorbic, and oleic acids, and aromatic monocarboxylic acids (having at least 7 carbon atoms), as exemplified by benzoic and toluic acids. These acids or anhydrides, if used, should supplement and not completely replace the aliphatic, saturated or mono- or poly-ethylenically unsaturated mono-carboxylic acids mentioned above in the preparation of the esters of group (a), and reaction with available free hydroxyl groups of the polyhydric alcohol or ester of group (a), above, to form ester linkages therewith.

We prefer to add these supplementary acids or anhydrides, in making our coating resins, by either first making the ester of group (a), above, and then adding such acids or anhydrides to the ester, or reacting such supplementary acids or anhydrides with the alcohol of group (a), above, to form an ester and then further esterifying available free hydroxyl groups with the aliphatic, saturated or mono- or poly-ethylenically unsaturated monocarboxylic acid referred to above in making the ester of group (a).

We have found that the proportions of reactants are important in preparing our new reaction product. About 40 to 90% of the aliphatic, saturated or mono- or poly-ethylenically unsaturated monocarboxylic acid ester of polyhydric alcohol must be reacted with about 5–40% of organosiloxane and about 5–40% of organic polyisocyanate. We have found that it is advantageous to have the total reactive groups on the combined siloxane and polyisocyanate not exceed the number of free hydroxyl groups in the aliphatic, saturated or mono- or poly-ethylenically unsaturated monocarboxylic acid ester of polyhydric alcohol, unless an aliphatic monohydric alcohol such as butanol or Cellosolve (2-ethoxyethanol) is used to react with the excess polyisocyanate.

Our liquid coating compositions should have about 10–70% by weight non-volatile material. The volatile material may include a liquid solvent vehicle such as exemplified by aliphatic hydrocarbons, aromatic hydrocarbons (e.g., xylol and toluol), ketones (e.g., methyl ethyl ketone, methyl isobutyl ketone, diacetone alcohol, isophorone, and diisobutyl ketone), glycol ethers (e.g., butyl carbitol and diethylene glycol monoethyl ether), nitro-paraffins (2-nitropropane), and esters (e.g., butyl acetate and amyl acetate).

If desired, pigments may be included in our coating compositions, such as phthalocyanine green, molybdate orange, chrome yellow, Bentone 34 (i.e., dimethyldioctadecyl ammonium bentonite), zinc oxide, titanium dioxide (rutile or non-chalking rutile), chromium oxide, zinc chromate, calcium chromate, carbon black and flaked aluminum. One may omit the pigment, or one may use, for example, from one part by weight particulate pigment to one part by weight of our reaction product of (a) aliphatic, saturated or mono- or poly-ethylencially unsatured monocarboxylic fatty acid ester of polyhydric alcohol wherein the polyhydric alcohol portion of said ester has at least two available hydroxyl groups, (b) organosiloxane having available hydroxy and/or alkoxy groups, and (c) polyisocyanate; one may also use, for example, up to about 9 or 30 parts by weight pigment to about one part of such reaction product.

The following Examples I–VII illustrate a procedure that may be used to produce some of our new reaction products of (a) aliphatic, saturated mono- or poly-ethylenically unsaturated monocarboxylic fatty acid ester of polyhydric alcohol wherein the polyhydric alcohol portion of said ester has at least 2 free hydroxyl groups, (b) an organosiloxane having free hydroxy and/or alkoxy groups, and (c) a polyisocyanate. The molecular weight of such reaction products, for example, may have an average molecular weight of about 3,000 to 6,000–30,000. Examples VIII–XIV, below, illustrate coating compositions that may be prepared with reaction products such as herein described and shown in Examples I–VII.

EXAMPLE I

A three-neck flask of the type that is commonly used for preparing or cooking resins should be equipped with an agitator, thermometer, and an inert gas line that permits inert (e.g., air with oxygen removed) to circulate in the flask. The agitator or stirrer and inert gas line should be used throughout the hereinafter described procedure.

530 grams of soybean oil, 125 grams of technical grade pentaerythritol (about 86% monopentaerythritol and about 14% polypentaerythritol) are added to the flask. The resulting admixture should be heated to about 400° F. 0.3 gram of calcium acetate should be added to the flask and the contents of the flask raised to about 460° F. The contents of the flask should be maintained at about 460° F. until about 1 part by volume of the admixture in the flask is soluble in about 4 parts by volume methanol. At this point, the admixture should be cooled to about 350° F. 1011 grams of mineral spirits (e.g., boiling point of about 310–405° F.) and 225 grams of phenylloweralkylsilsequioxane (Dow Corning Z–6018) having free hydroxy groups (a major proportion of the substituted organo groups being phenyl groups) should be added to the contents of the flask.

A Dean and Stark trap and condenser should be fitted to the flask. The contents of the flask should then be raised to reflux temperature (approximately 294–354° F.) and hold at reflux temperature (while trapping water) for about 1½ to 4 hours in order to produce a product that will produce a clear resin when baked on glass for about 10–30 minutes in an oven at about 350° F.

Then, the admixture should be cooled to about 120–180° F. About 243 grams of toluene diisocyanate (i.e., Hylene TM, a product having 80% of the 2,4-isomer and 20% of the 2,6-isomer) should be added to the admixture at a controlled rate so that the temperature of the exothermic reaction does not exceed about 190° F. After the exotherm has subsided, the temperature should be raised to about 195 to 220° F. and maintained at the temperature until the viscosity (Gardner-Holdt) is V to Z–6, at which point 75 grams of Cellsolve (2-ethoxyethanol) and 37.5 grams of Enco Aromatic 100 (kauri-butanol value of about 91, mixed aniline point of about 14.9° C., flask point Tag closed cup, of about 113° F., specific gravity, 60/60° F., of about 0.8729, API gravity, 60/60° F., of about 30.6, initial boiling point of about 318° F., final boiling point of about 359° F., about 3.4 vol. percent of $C_8$ aromatics, about 78.8 vol. percent of $C_9$ aromatics, about 13.5 vol. percent of $C_{10}$ aromatics, about 0.5 vol. percent of $C_{11}$ aromatics, and about 1.8 vol. percent of indans) are added. The temperature of the admixture should be maintained at about 195–200° F. for about 30 minutes.

The admixture should then be filtered through a Buchner funnel. The clear resin solution that is recovered has approximately 50° by weight non-volatiles.

EXAMPLE II

A three-neck flask of the type that is commonly used for preparing or cooking resins should be equipped with an agitator, thermometer, and an inert gas line that permits inert gas (e.g., air with oxygen removed) to circulate in the flask. The agitator or stirrer and inert gas line should be used throughout the hereinafter described procedure.

941 grams of soybean oil, 226 grams of technical grade pentaerythritol (about 86% monopentaerythritol and about 14% polypentaerythritol) are added to the flask. The resulting admixture should be heated to about 400° F. 0.55 gram of calcium acetate should be added to the flask and the contents of the flask raised to about 460° F. The contents of the flask should be maintained at about 460° F. until about 1 part by volume of the admixture in the flask is soluble in about 4 parts by volume methanol. At this point, the admixture should be cooled to about 300° F. 673 grams of xylol (e.g., boiling point of about 276–288° F.) and 400 grams of phenylloweralkylsilsequioxane (Dow Corning Z-6018) having free hydroxy groups (a major proportion of the substituted organo groups being phenyl groups) should be added to the contents of the flask.

A Dean and Stark trap and condenser should be fitted to the flask. The contents of the flask should then be raised to reflux temperature (approximately 280–315° F.) and held at reflux temperature (while trapping water) for about 1½ to 4 hours in order to produce a product that will produce a clear resin when baked on glass for about 10–25 minutes in an oven at about 400° F. 763 grams of xylol should then be added to the flask.

Then, the admixture should be cooled to about 120–180° F. About 432 grams of toluene diisocyanate (i.e., Nacconate 80, a product having 80% of the 2,4-isomer and 20% of the 2,6-isomer) should be added to the admixture at a controlled rate so that the temperature of the exothermic reaction does not exceed about 190° F. Afer the exotherm has subsided, the temperature should be raised to about 195 to 220° F. and maintained at that temperature until the viscosity (Gardner-Holdt) is Z to Z–6, at which point 133 grams of butanol and 66.5 grams of xylol are added.

The admixture should then be filtered through a Buchner funnel. The clear resin solution that is recovered has approximately 55% by weight non-volatiles.

EXAMPLE III

A three-neck flask of the type that is commonly used for preparing or cooking resins should be equipped with an agitator, thermometer, and an inert gas line that permits inert gas (e.g., air with oxygen removed) to circulate in the flask. The agitator or stirrer and inert gas line should be used throughout the hereinafter described procedure.

941 grams of soybean oil, 226 grams of technical grade pentaerythritol (about 86% monopentaerythritol and about 14% polypentaerythritol) are added to the flask. The resulting admixture should be heated to about 400° F. 0.55 gram of calcium acetate should be added to the flask and the contents of the flask raised to about 460° F. The contents of the flask should be maintained at about 460° F. until about 1 part by volume of the admixture in the flask is soluble in about 4 parts by volume methanol. 49 grams of phthalic anhydride are then added to the admixture. The temperature is maintained at 450–460° F. until an A.N. (acid number) of less than 1 is obtained. At this point, the admixture should be cooled to about 300° F. 673 grams of xylol (e.g., boiling point of about 276–288° F.) and 360 grams of phenylloweralkylsilsequioxane (Dow Corning Z-6018) having free hydroxy groups (a major proportion of the substituted organo groups being phenyl groups) should be added to the contents of the flask.

A Dean and Stark trap and condenser should be fitted to the flask. The contents of the flask should then be raised to reflux temperature (approximately 280–315° F.) and held at reflux temperature (while trapping water) for about 1½ to 4 hours in order to produce a product that will produce a clear resin when baked on glass for about 10–25 minutes in an oven at about 400° F. 735 grams of xylol should then be added to the flask.

Then, the admixture should be cooled to about 120–180° F. About 389 grams of toluene diisocyanate (i.e., Nacconate 80, a product having 80% of the 2,4-isomer and 20% of the 2,6-isomer) should be added to the admixture at a controlled rate so that the temperature of the exothermic reaction does not exceed about 190° F. Afer the exotherm has subsided, the temperature should be raised to about 195 to 220° F. and maintained at that temperature until the viscosity (Gardner-Holdt) is Z to Z–6, at which point 133 grams of butanol and 66.5 grams of xylol are added.

The admixture should then be filtered through a Buchner funnel. The clear resin solution that is recovered has approximately 55% by weight non-volatiles.

EXAMPLE IV

A three-neck flask of the type that is commonly used for preparing or cooking resins should be equipped with an agitator, thermometer, and an inert gas line that permits inert gas (e.g., air with oxygen removed) to circulate in the flask. The agitator or stirrer and inert gas line should be used throughout the hereinafter described procedure.

941 grams of soybean oil, 226 grams of technical grade pentaerythritol (about 86% monopentaerythritol and about 14% polypentaerythritol) are added to the flask. The resulting admixture should be heated to about 400° F. 0.55 gram of calcium acetate should be added to the flask and the contents of the flask raised to about 460° F. The contents of the flask should be maintained at about 460° F. until about 1 part by volume of the admixture in the flask is soluble in about 4 parts by volume methanol. 48 grams of adipic acid are then added to the admixture. The temperature is maintained at 450–460° F. until an A.N. (acid number) of less than 1 is obtained. At this point, the admixture should be cooled to about 300° F. 673 grams of xylol (e.g., boiling point of about 276–288° F.) and 360 grams of phenylloweralkylsilsequioxane (Dow Corning Z-6018) having free hydroxy groups (a major proportion of the substituted organo groups being phenyl groups) should be added to the contents of the flask.

A Dean and Stark trap and condenser should be fitted to the flask. The contents of the flask should then be raised to reflux temperature (approximately 280–315° F.) and held at reflux temperature (while trapping water) for about 1½ to 4 hours in order to produce a product that will produce a clear resin when baked on glass for about 10–25 minutes in an oven at about 400° F. 735 grams of xylol should then be added to the flask.

Then, the admixture should be cooled to about 120–180° F. About 389 grams of toluene diisocyanate (i.e., Nacconate 80, a product having 80% of the 2,4-isomer and 20% of the 2,6-isomer) should be added to the admixture at a controlled rate so that the temperature of the exothermic reaction does not exceed about 190° F. After the exotherm has subsided, the temperature should be raised to about 195 to 220° F. and maintained at that temperature until the viscosity (Gardner-Holdt) is Z to Z–6, at which point 133 grams of butanol and 66.5 grams of xylol are added.

The admixture should then be filtered through a Buchner funnel. The clear resin solution that is recovered has approximately 55% by weight non-volatiles.

EXAMPLE V

A three-neck flask of the type that is commonly used for preparing or cooking resins should be equipped with an agitator, thermometer, and an inert gas line that permits inert gas (e.g., air with oxygen removed) to circulate in the flask. The agitator or stirrer and inert gas line should be used throughout the hereinafter described procedure.

941 grams of soybean oil, 226 grams of technical grade pentaerythritol (about 86% monopentaerythritol and about 14% polypentaerythritol) are added to the flask. The resulting admixture should be heated to about 400° F. 0.55 gram of calcium acetate should be added to the flask and the contents of the flask raised to about 460° F. The contents of the flask should be maintained at about 460° F. until about 1 part by volume of the admixture in the flask is soluble in about 4 parts by volume methanol. 49 grams of benzoic acid are then added to the admixture. The temperature is maintained at 450–460° F. until an A.N. (acid number) of less than 1 is obtained. At this point, the admixture should be cooled to about 300° F. 673 grams of xylol (e.g., boiling point of about 276–288° F.) and 372 grams of phenylloweralkylsilsequioxane (Dow Corning Z–6018) having free hydroxy groups (a major proportion of the substituted organo groups being phenyl groups) should be added to the contents of the flask.

A Dean and Stark trap and condenser should be fitted to the flask. The contents of the flask should then be raised to reflux temperature (approximately 280–315° F.) and held at reflux temperature (while trapping water) for about 1½ to 4 hours in order to produce a product that will produce a clear resin when baked on glass for about 10–25 minutes in an oven at about 400° F. 756 grams of xylol should then be added to the flask.

Then, the admixture should be cooled to about 120–180° F. About 403 grams of toluene diisocyanate (i.e., Nacconate 80, a product having 80% of the 2,4-isomer and 20% of the 2,6-isomer) should be added to the admixture at a controlled rate so that the temperature of the exothermic reaction does not exceed about 190° F. After the exotherm has subsided, the temperature should be raised to about 195 to 220° F. and maintained at that temperature until the viscosity (Gardner-Holdt) is U to Z–6, at which point 133 grams of butanol and 66.5 grams of xylol are added.

The admixture should then be filtered through a Buchner funnel. The clear resin solution that is recovered has approximately 55% by weight non-volatiles.

EXAMPLE VI

A three-neck flask of the type that is commonly used for preparing or cooking resins should be equipped with an agitator, thermometer, and an inert gas line that permits inert gas (e.g., air with oxygen removed) to circulate in the flask. The agitator or stirrer and inert gas line should be used throughout the hereinafter described procedure.

918 grams of oleic acid, 102 grams of glycerol (high gravity, 98%), and 228 grams of technical grade pentaerythritol (about 86% monopentaerythritol and about 14% polypentaerythritol) are added to the flask. The resulting admixture should be heated to about 325° F. 0.60 gram of calcium acetate should be added to the flask and the contents of the flask raised to about 460° F. The contents of the flask should be maintained at 460° F. until an A.N. (acid number) of less than one is obtained. At this point, the admixture should be cooled to about 300° F. 685 grams of xylol (e.g., boiling point of about 276–288° F.) and 405 grams of phenylloweralkylsilsequioxane (Dow Corning Z–6018) having free hydroxyl groups (a major proportion of the substituted organo groups being phenyl groups) should be added to the contents of the flask.

A Dean and Stark trap and condenser should be fitted to the flask. The contents of the flask should then be raised to reflux temperature (approximately 280–315° F.) and held at reflux temperature (while trapping water) for about 1½ to 4 hours in order to produce a product that gives a clear resin when baked on glass for about 10–25 minutes in an oven at about 400° F. 777 grams of xylol should then be added to the flask.

Then, the admixture should be cooled to about 120–180° F. About 440 grams of toluene diisocyanate (i.e., Nacconate 80, a product having 80% of the 2,4-isomer and 20% of the 2,6-isomer) should be added to the admixture at a controlled rate so that the temperature of the reaction mixture does not exceed about 190° F. After the exotherm has subsided, the temperature should be raised to about 195 to 220° F. and maintained at that temperature until the viscosity (Gardner-Holdt) is Z to Z–6, at which point 134 grams of butanol and 65 grams of xylol are added.

The admixture should then be filtered through a Buchner funnel. The clear resin solution that is recovered has approximately 55% by weight non-volatiles.

EXAMPLE VII

A three-neck flask of the type that is commonly used for preparing or cooking resins should be equipped with an agitator, thermometer, and an inert gas line that permits inert gas (e.g., air with oxygen removed) to circulate in the flask. The agitator or stirrer and inert gas line should be used throughout the hereinafter described procedure.

941 grams of refined coconut oil, 226 grams of technical grade pentaerythritol (about 86% monopentaerythritol and about 14% polypentaerythritol) are added to the flask. The resulting admixture should be heated to about 400° F. 0.55 gram of calcium acetate should be added to the flask and the contents of the flask raised to about 460° F. The contents of the flask should be maintained at about 460° F. until about 1 part by volume of the admixture in the flask is soluble in about 4 parts by volume methanol. At this point, the admixture should be cooled to about 300° F. 673 grams of xylol (e.g., boiling point of about 276–288° F.) and 400 grams of phenylloweralkylsilsequioxane (Dow Corning Z–6018) having free hydroxyl groups (a major portion of the substituted organo groups being phenyl groups) should be added to the contents of the flask.

A Dean and Stark trap and condenser should be fitted to the flask. The contents of the flask should then be raised to reflux temperature (approximately 280–315° F.) and held at reflux temperature (while trapping water) for about 1½ to 4 hours in order to produce a product that will produce a clear resin when baked on glass for about 10–25 minutes in an oven at about 400° F. 1123 grams of xylol should then be added to the flask.

Then, the admixture should be cooled to about 120–180° F. About 432 grams of toluene diisocyanate (i.e., Nacconate 80, a product having 80% of the 2,4-isomer and 20% of the 2,6-isomer) should be added to the admixture at a controlled rate so that the temperature of the exothermic reaction does not exceed about 190° F. After the exotherm has subsided, the temperature should be raised to about 195° F. and maintained at that temperature until the viscosity (Gardner-Holdt) is Z to Z–6, at which point 133 grams of butanol and 66.5 grams of xylol are added.

The admixture should then be filtered through a Buchner funnel. The clear resin solution that is recovered has approximately 50% by weight non-volatiles.

Sylkyd 50, which is described above, may be used (in the above examples) in place of the siloxane (i.e., Dow Corning Z–6018) that is mentioned in the above examples.

The reaction product produced from Example I, above, as well as the products of any of Examples II–VII, above, may be used in coating compositions such as shown in Example VIII, below, by simply admixing the resinous reaction products of such examples with the remaining ingredients or constituents specified in Example VIII. Example IX, below, a similar liquid coating composition, includes the resinous reaction product of Example VI, above.

EXAMPLE VIII

Liquid coating composition

| | Grams |
|---|---|
| Liquid, ester-siloxane-polyisocyanate reaction product of Example I (about 50% solution) | 1660 |
| Cobalt naphthenate (6% cobalt) | 7 |
| Calcium naphthenate (5% calcium) | 7 |
| Zirco [1] (dryer catalyst) | 10 |
| Exkin No. 1 [1] (antiskinning agent) | 4.5 |
| Nilskin [3] (antiskinning agent) | 4.5 |

[1] Product (see U.S. Patents 2,739,902 and 2,739,905) comprising zirconium organic complex having 5.9–6.1% zirconium metal in the form ZrO++ bound to an organic acid in odorless mineral spirits, and having the following characteristics:

| | |
|---|---|
| Color (Gardner) | 4 max. |
| Viscosity (Gardner-Holdt) | Less than A. |
| Sp. grav., 60° F. | 0.855–0.875. |
| Pounds/gallon | 7.13–7.3 |
| Percent non-volatile | 28% max. |
| Solvent | Odorless mineral spirits. |

[2] Product comprising butyral oxime and having abount 100% volatile material.
[3] Product comprising an admixture of oxime-lower alkyl alcohol reaction products free of nitrile and having the following characteristics:

| | |
|---|---|
| Color | Light straw. |
| Sp. grav. | 0.85–0.853. |
| Pounds/gallon | 7. |
| Volatile material | 98% distills below 160° C. |
| Mineral spirits tolerance | Infinite. |
| Acid No. | Less than 1. |
| Moisture | 0.5% max. |

EXAMPLE IX

The resinous reaction product obtained in Example VI, above, was tested for drying in the following liquid coating composition:

Liquid coating composition

| | | |
|---|---|---|
| Liquid, ester-siloxane-polyisocyanate reaction product of Example VI (about 55% solution) | grams | 100 |
| Xylol | do | 20 |
| Cobalt naphthenate (6% cobalt) | cc | 0.5 |
| Lead naphthenate (24% lead) | cc | 1.0 |

A panel that was coated with this composition was air-dried. After 60 hours, a hard, tack-free film was obtained.

The liquid coating compositions shown in Examples X and XI, below, were prepared by mixing the zinc oxide pigment with 15 parts by weight of the resinous reaction product of Example II, above, and xylol. The resulting admixtures were roller milled for one pass. In making the coating compositions, the remaining parts by weight of the reaction product of Example II, followed by cobalt naphthenate, were then added while mixing the respective admixtures. One part by volume of xylol was then added to 3 parts by volume of the resulting compositions for drawdown application with a 0.008 drawdown rod to a substrate. The coatings were then air-dried.

EXAMPLE X

| | Parts by weight |
|---|---|
| Reaction product of Example II, above, having 55% by weight non-volatiles | 87 |
| Cobalt naphthenate (6% cobalt) | 0.4 |
| Zinc oxide pigment | 120 |
| Xylol | 15 |

EXAMPLE XI

| | Parts by weight |
|---|---|
| Reaction product of Example II, above, having 55% by weight non-volatiles | 27 |
| Cobalt naphthenate (6% cobalt) | 0.15 |
| Zinc oxide pigment | 120 |
| Xylol | 15 |

Examples XII–XIV, below, exemplify liquid coating compositions having the resinous reaction product of Example I, above, and pigments such as phthalocyanine green, chromium oxide, oxide green, Bentone 34 (dimethyldioctadecyl ammonium bentonite), molybdate orange, chrome yellow, and titanium dioxide (rutile). The compositions were prepared by first grinding the "ingredients for grind" in a three-roll mill and then thinning the resulting product by adding the "ingredients for let-down."

EXAMPLE XII

Liquid coating composition [1]

| Ingredients for grind: | percent by weight |
|---|---|
| Phthalocyanine green | 2.81 |
| Chromium oxide green | 12.71 |
| Bentone 34 [2] | .31 |
| Liquid, ester-siloxane-polyisocyanate reaction product of Example I (about 50% solution) | 20.00 |
| Nuodex 254 [3] (24% cobalt) | .31 |
| Exkin No. 1 | .23 |
| Ingredients for let-down: | |
| Liquid, ester-siloxane-polyisocyanate reaction product of Example I (about 50% solution) | 53.50 |
| Cobalt naphthenate (6% cobalt) | .31 |
| Calcium naphthenate (5% calcium) | .31 |
| Zirco | .45 |
| Nilskin | .37 |
| V.M. & P. naphtha | 8.36 |
| Butyl Cellosolve | .33 |
| | 100.00 |

[1] See the following table:

| | |
|---|---|
| Viscosity | 96 K.U. (Krebbs units as determined with Stormer viscometer). |
| Pounds/gal. | 8.60. |
| Non-volatile materials | 52.58% (by weight). |

[2] Dimethyldioctadecyl ammonium bentonite.
[3] Cobalt hydroxy naphthenate paste.

EXAMPLE XIII

Liquid coating composition [1]

| Ingredients for grind: | percent by weight |
|---|---|
| Molybdate orange | .67 |
| Chrome yellow | 31.20 |
| Bentone 34 | .20 |
| Nuodex 254 (24% cobalt) | .12 |
| Liquid, ester-siloxane-polyisocyanate reaction product of Example I (about 50% solution) | 28.20 |
| Ingredients for let-down: | |
| Liquid, ester-siloxane-polyisocyanate reaction product of Example I (about 50% solution) | 28.40 |
| Cobalt naphthenate (6% cobalt) | .23 |
| Calcium naphthenate (5% calcium) | .23 |
| Zirco | .33 |
| Exkin No. 1 | .15 |
| Nilskin | .42 |
| V.M. & P. naphtha | 9.50 |
| Butyl Cellosolve | .35 |
| | 100.00 |

[1] See the following table:

| | |
|---|---|
| Viscosity | 85 K.U. (Krebbs units as determined with Stormer viscometer). |
| Pounds/gal. | 10.30. |
| Nonvolatile materials | 60.37% (by weight). |

EXAMPLE XIV

*Liquid coating composition* [1]

| Ingredients for grind: | percent by weight |
|---|---|
| Titanium dioxide (rutile) | 33.85 |
| Bentone 34 | .21 |
| Liquid, ester-siloxane-polyisocyanate reaction product of Example I (about 50% solution) | 25.85 |
| Nuodex 254 (24% cobalt) | .14 |
| Exkin No. 1 | .15 |
| Ingredients for let-down: | |
| Liquid, ester-siloxane-polyisocyanate reaction product of Example I (about 50% solution) | 32.50 |
| Cobalt naphthenate (6% cobalt) | .25 |
| Calcium naphthenate (5% calcium) | .25 |
| Zirco | .35 |
| Nilskin | .30 |
| V.M. & P. naphtha | 5.87 |
| Butyl Cellosolve | .28 |
| | 100.00 |

[1] See the following table:
  Viscosity _____ 88 K.U. (Krebbs units as determined with Stormer viscometer).
  Pounds/gal. _____ 10.28.
  Nonvolatile materials __ 63.21% (by weight).

The foregoing detailed description has been given for clearness of understanding only, and no unnecessary limitations should be understood therefrom, as modifications will be obvious to those skilled in the art.

We claim:

1. The resin reaction product of aliphatic monocarboxylic fatty acid ester of polyhydric alcohol wherein the polyhydric alcohol portion of said ester has at least 2 free hydroxyl groups, a relatively low molecular weight organosiloxane having a member from the class consisting of free hydroxy, free lower alkoxy, and both free hydroxy and free lower alkoxy groups, and organopolyisocyanate selected from the group consisting of aliphatic polyisocyanates, arylene diisocyanates, and aryl triisocyanates, and wherein the organosiloxane and organopolyisocyanate are chemically bonded to said alcohol portion of said ester.

2. The reaction product of claim 1 wherein said acid ester of polyhydric alcohol includes a different carboxylic acid ester group of said same alcohol selected from the group consisting of aliphatic saturated carboxylic acids, aliphatic ethylenically unsaturated carboxylic acids, aromatic carboxylic acids, and acid anhydrides thereof.

3. The reaction product of claim 1 wherein the organosiloxane is a member of the group consisting of diloweralkyltriloweralkoxytrisiloxanes and phenylsilsequioxanes.

4. The film-forming resin reaction product of about 40–90% by weight of aliphatic monocarboxylic fatty acid ester of polyhydric alcohol wherein the polyhydric alcohol portion of said ester has at least 2 free hydroxyl groups, about 5–40% by weight of a relatively low molecular weight organosiloxane having a member from the class consisting of free hydroxy, free lower alkoxy, and both free hydroxy and free lower alkoxy groups, and about 5–40% by weight of organopolyisocyanate selected from the group consisting of aliphatic polyisocyanates, arylene diisocyanates, and aryl triisocyanates, and wherein the organosiloxane and organopolyisocyanate are chemically bonded to said alcohol portion of said ester.

5. The reaction product of claim 4 wherein said acid ester of polyhydric alcohol includes a different carboxylic acid ester group of said same alcohol selected from the group consisting of aliphatic saturated carboxylic acids, aliphatic ethylenically unsaturated carboxylic acids, aromatic carboxylic acids, and acid anhydrides thereof.

6. The reaction product of claim 4 wherein the organosiloxane is a member of the group consisting of diloweralkyltriloweralkoxytrisiloxanes and phenylsilsequioxanes.

7. A coating composition which comprises (a) a film-forming resin that is a reaction product of aliphatic monocarboxylic fatty acid ester of polyhydric alcohol wherein the polyhydric alcohol portion of said ester has at least 2 free hydroxyl groups, a relatively low molecular weight organosiloxane and organopolyisocyanate selected from the group consisting of aliphatic polyisocyanates, arylene diisocyanates, and aryl triisocyanates, and wherein the organosiloxane and organopolyisocyanate are chemically bonded to said alcohol portion of said ester, and (b) pigment.

8. The composition of claim 7 wherein said acid ester of polyhydric alcohol includes a different carboxylic acid ester group of said same alcohol selected from the group consisting of aliphatic saturated carboxylic acids, aliphatic ethylenically unsaturated carboxylic acids, aromatic carboxylic acids, and acid anhydrides thereof.

9. The composition of claim 7 wherein the organosiloxane is a member of the group consisting of diloweralkyltriloweralkoxytrisiloxanes and phenylsilsequioxanes.

10. The composition of claim 7 wherein the pigment is a metal pigment.

11. A coating composition which comprises (a) about 1 part by weight of a film-forming resin that is a reaction product of aliphatic monocarboxylic fatty acid ester of polyhydric alcohol wherein the polyhydric alcohol portion of said ester has at least 2 free hydroxyl groups, a relatively low molecular weight organosiloxane and organopolyisocyanate selected from the group consisting of aliphatic polyisocyanates, arylene diisocyanates, and aryl triisocyanates, and wherein the organosiloxane and organopolyisocyanate are chemically bonded to said alcohol portion of said ester, and (b) about 1–9 parts by weight pigment.

12. A thin flexible substrate having a coating composition which comprises (a) about 1 part by weight of a film-forming resin that is a reaction product of aliphatic monocarboxylic fatty acid ester of polyhydric alcohol wherein the polyhydric alcohol portion of said ester has at least 2 free hydroxyl groups, a relatively low molecular weight organosiloxane and organopolyisocyanate selected from the group consisting of aliphatic polyisocyanates, arylene diisocyanates, and aryl triisocyanates, and wherein the organosiloxane and organopolyisocyanate are chemically bonded to said alcohol portion of said ester, and (b) about 1–9 parts by weight pigment.

13. The product of claim 12 wherein said resin is the reaction product of about 40–90% by weight of said ester, about 5–40% by weight of said organosiloxane and about 5–40% by weight of said organopolyisocyanate.

References Cited by the Examiner

UNITED STATES PATENTS

| 2,358,475 | 9/1944 | Pratt et al. | 260—18 |
| 2,527,590 | 10/1950 | Speier | 260—77.5 |
| 2,529,956 | 11/1950 | Myles et al. | 260—77.5 |
| 2,550,205 | 4/1951 | Speier | 260—77.5 |
| 2,884,388 | 4/1959 | Hedlund | 260—18 |
| 2,901,449 | 8/1959 | Schwarz et al. | 260—18 |
| 2,924,588 | 2/1960 | Speier | 260—77.5 |
| 2,925,402 | 2/1960 | Speier | 260—77.5 |
| 2,931,786 | 4/1960 | Clark et al. | 260—77.5 |

OTHER REFERENCES

Chemistry of Silicones, Rochow; Chapman-Hall Ltd., London; 1951, p. 119.

LEON J. BERCOVITZ, *Primary Examiner.*

C. W. IVY, *Assistant Examiner.*